United States Patent [19]

Dumesnil et al.

[11] Patent Number: 5,188,990

[45] Date of Patent: Feb. 23, 1993

[54] LOW TEMPERATURE SEALING GLASS COMPOSITIONS

[75] Inventors: Maurice E. Dumesnil, Los Altos Hills; Leo Finkelstein, San Francisco, both of Calif.

[73] Assignee: VLSI Packaging Materials, Sunnyvale, Calif.

[21] Appl. No.: 795,873

[22] Filed: Nov. 21, 1991

[51] Int. Cl.⁵ .................. C03C 3/12; C03C 8/18; C03C 8/14; C03C 8/24
[52] U.S. Cl. .................. 501/19; 106/1.14; 428/426; 428/428; 428/432; 428/433; 428/434; 501/15; 501/17; 501/18; 501/32; 501/41; 501/43; 501/46
[58] Field of Search .................. 501/15, 17, 32, 18, 501/19, 41, 43, 46; 106/1.14; 428/426, 428, 432, 433, 434

[56] References Cited

U.S. PATENT DOCUMENTS

| | | | |
|---|---|---|---|
| 4,743,302 | 5/1988 | Dumesnil et al. | 501/41 |
| 4,945,071 | 7/1990 | Friesen et al. | 501/41 |
| 5,013,360 | 5/1991 | Finkelstein et al. | 501/32 |
| 5,013,697 | 5/1991 | Akhtar | 501/46 |
| 5,066,621 | 11/1991 | Akhtar | 501/32 |

*Primary Examiner*—Mark L. Bell
*Attorney, Agent, or Firm*—Morrison & Foerster

[57] ABSTRACT

Low temperature sealing glass compositions comprising 35 to 80% by weight $TeO_2$, 15 to 50% $V_2O_5$ and 0.1 to 20% $Nb_2O_5$, $ZrO_2$ and/or ZnO.

16 Claims, No Drawings

LOW TEMPERATURE SEALING GLASS COMPOSITIONS

TECHNICAL FIELD

This invention relates to novel low temperature metal oxide glasses useful as semiconductor packaging materials.

More specifically, it concerns highly stable and chemically resistant low temperature glasses derived from the tellurium vanadium oxide binary system by the addition of specific metal oxides. These glasses can be admixed in powder form with refractory fillers or with noble metals preferably silver metal powder.

BACKGROUND

This invention addresses the problem of sealing semiconductor devices in hermetic ceramic packages with a low temperature sealing glass. Concurrently this invention addresses the problem of bonding (die attach) to a ceramic surface certain types of temperature-sensitive semiconductor devices at the lowest possible temperature. Since the onset of integrated circuits fabricated on silicon single crystal wafers around 1964, very fast semiconductor devices have been designed by a process known as bipolar technology which relies on deep diffusion silicon structures. These devices being somewhat temperature and surface insensitive were readily alloyed, die attached, and hermetically sealed in alumina ceramic packages at 450°-500° C.

A rapidly growing competing design technology based not on pn junction high current injection but on surface capacitive channel switching called CMOS (complementary metal silicon oxide semiconductor) requires much less power to operate. Since the speed of CMOS designs is increasing so quickly they will soon outstrip almost all competing semiconductor technologies with a concurrent increasing impact in portable, work station and mainframe computers. This increased operational speed in CMOS is critically dependent on submicron scale masking technology.

Very large scale integrated semiconductor devices (VLSI) such as large 300 to 600 mil square CMOS and BiCMOS silicon chips are quite sensitive to the thermal processes required during their last fabrication steps. These include metal contact alloying, die attach and final seal. These are presently performed in the 400° to 450° C. range for a few minutes. The thermal sensitivity of CMOS semiconductor devices arises due to the presence of extremely dense, compact, ultrafine metallization lines reaching a fraction of a micron line widths combined with ultrathin dielectric films reaching the 100 angstrom range thickness. These three-dimensional-surface interconnection patterns are prone to immediate or longer term failure modes such as metal diffusion, alloying and dielectric punchthrough. Industry consensus indicates that these fabrication steps should be made below 400° C. and preferably close to 350° C. to insure greater fabrication yields, throughput and long-term reliability.

Glass sealing and silver/glass die attach processes are critically dependent on the available materials which today are derived from the lead borate oxide glass system. Commercial lead borate glasses used for semiconductor packaging applications typically have glass transition temperatures (Tg) in the region of 325° C. and softening points in the region of 375° C. Present package sealing and silver/glass die attach materials require a processing temperature of 430° to 450° C.

The key factor in potentially achieving lower processing temperatures would be the availability of the right glass material. While some very low temperature metal oxide glasses are known to exist with glass transition temperatures in the 250° to 350° C. level, most are not useful for semiconductor application. The limiting factors are thermal instability (the glass recrystallizes too early), mechanical instability (the glass recrystallizes when ground to a fine powder), poor moisture resistance (many metal oxide glasses dissolve in hot water) and the presence in the glass formulation of alkali metals and halides—components known to affect deleteriously the performance of most semiconductor devices.

To date, serious attempts to design a practical and reliable lower temperature (300°-400° C.) sealing glass have met with formidable technical barriers, the search being hampered by the fact that in the course of new material evolution the design of glasses remains largely an empirical science.

The requirements for a semiconductor ceramic package sealing glass are numerous and demanding. Somehow these must be met with one single chemical formulation preferably produced as a glass melt rapidly quenched to room temperature. The basic material and processing requirements for a commercially practical sealing glass can be listed as:

1. formation of a true solution (homogeneous melt) of the metal oxide mixture;
2. glass formation during rapid cooling of the melt (solidified liquid);
3. low glass viscosity at seal temperature (350° C.);
4. no tendency to crystallize (glass stability) during seal formation and completion;
5. a reasonably low linear thermal expansion (50 to $140 \times 10^{-7}/°C.$);
6. ease of linear thermal expansion adjustment by the addition of a lower expansion coefficient filler;
7. glass chemical stability (insoluble in water, resistant to acids, alkalies and hot water);
8. good wetting and high bonding strength to alumina ceramic surfaces;
9. no presence in the formula of alkali or other fast-migrating ions (electronic applications) or volatile components that create serious health hazards (such as arsenic oxide, thallium oxide, etc.);
10. capacity for producing a strong, tight and hermetic seal to a glass, metal and ceramic surface and capability of surviving several hundred cycles of thermal shocks, liquid to liquid, condition C (MIL-STD-883); and
11. ease of commercial processing.

The present invention concerns glasses derived from the tellurium vanadium oxide binary by the addition of niobium pentoxide, zinc oxide, zirconium oxide and tantalum oxide. Other oxide additives compatible with tellurium vanadium oxide glasses are bismuth oxide and cupric oxide.

One prior U.S. Pat. No. 4,945,071 claims a four component $Ag_2O/V_2O_5/TeO_2/PbO$ glass. The presently claimed glasses are distinct from this patent in that the present glass system does not contain silver oxide ($Ag_2O$). Silver oxide may make the glass unstable, particularly in the presence of fillers. The patent also does not describe the use of niobium oxide, zirconium oxide and/or tantalum oxide as components in glass. These oxides are included in preferred embodiments of the present glass.

U.S. Pat. No. 4,743,302 describes lead vanadium glasses that may contain up to 5% $TeO_2$. The present glasses are chemically distinct from the glasses of this patent as regards higher content of $TeO_2$ and lower content of PbO.

U.S. Pat. No. 5,013,697 describes lead vanadium glasses that may contain up to 15% $TeO_2$. The glasses of the present invention are distinct from the glasses of this patent as regards $TeO_2$ content.

It is an object of this invention to present a series of stable tellurium vanadium glasses, with or without compatible refractory fillers, suitable for sealing ceramic semiconductor packages at around 350° C. and suitable as well for use in silver/glass die attach systems in the 300° to 400° C. range.

DISCLOSURE OF THE INVENTION

The glasses of this invention are multicomponent glasses derived from the tellurium vanadium oxide binary with the addition of specifically selected metal oxides. The preferred additives are niobium pentoxide, zirconium oxide, zinc oxide and tantalum pentoxide. The resulting glasses are characterized by low transition temperatures many in the range of 280° C., a marked resistance to recrystallization in a fine powder form, and good durability in the presence of moisture.

Accordingly, one aspect of the present invention is a low melting glass composition comprising in weight percent calculated on an oxide basis:

| (a) | $TeO_2$: | 35 to 80% |
| --- | --- | --- |
| (b) | $V_2O_5$ | 15 to 50%, and | oxides selected from the groups consisting of

| (i) | $Nb_2O_5$, $ZrO_2$, and ZnO | 0.1 to 20%, |
| --- | --- | --- |
| (ii) | $Bi_2O_3$ and CuO | 0.1 to 30%, and |
| (iii) | $P_2O_5$ and $Ta_2O_5$ | 0.1 to 10% | said composition being substantially free of $Ag_2O$.

Another aspect of the invention are the above described glasses mixed with 1 to 50% by weight, based on the mixture, of a refractory filler powder having a low coefficient of linear expansion.

Still another aspect of the invention is a die attach paste comprising the above-described glass blended with silver, gold or other noble metal powder and dispersed in a nonvolatile organic liquid.

A further aspect of the invention is an article of manufacture for use in sealing an electronic part comprising a metal, glass, or ceramic body coated with a pattern of the above-described glass.

MODES FOR CARRYING OUT THE INVENTION

In addition to the components listed above, large amounts of PbO may be added to the glasses (up to 30%. The compositions may also contain up to 10% by weight either singly or in combination of: $SnO_2$, CdO, BaO, $WO_3$, $MoO_3$, $TiO_2$ and metal fluoride.

These glasses can also contain minor (up to a total of 5%) amounts of one or more oxides found in commercial glasses such as arsenic oxide, antimony oxide, thallium oxide, selenium oxide, transitional metal oxides, rare earth and alkaline earths. The precise amount of each compound will of course depend on its solubility in the glass composition.

Preferred glasses of this invention consist essentially of:
(a) $TeO_2$: 55 to 65%
(b) $V_2O_5$: 30 to 40%
(c) $Nb_2O_5$, ZnO and/or $ZrO_2$: 1 to 10%.
wherein all percentages add to 100%.

Glasses of this invention are characterized by Tg's as low as 280° C. and softening points in the 320° C. to 340° C. range. They exhibit good resistance to recrystallization even as fine powders and excellent durability to moisture.

The glasses of this invention can be utilized with or without the addition in powder form of compatible refractory ceramic filler to adjust the net coefficient of expansion of the resulting glass/filler mixture. These glasses can be used without filler in applications requiring thermal expansion coefficients in the 140 to $180 \times 10^{-7}$/°C. range. If lower thermal expansion coefficients are desired, these glasses can be combined in powder form with about 1% to 50% by weight based on the combination of expansion modifying refractory filler. Increased amounts of a low thermal expansion refractory filler will correspondingly decrease the linear expansion of the sealing glass, the decrease being practically a linear function of the glass/filler volume ratio. Such fillers are commonly used to make solder glass suitable for sealing to lower expansion ceramics, glasses, or metals. Close matching of thermal expansion of the sealing glass to the ceramic parts (e.g. alumina, berylia, or steatite parts) to be joined is critical to maintain zero stress in the seal joint. This insures strength and hermeticity under extreme conditions of thermal cycling and thermal shock.

It is also known that the presence in a glass of a crystalline second phase is beneficial in strengthening a glass seal. The addition of a particulate filler will minimize crack propagation throughout the glass. These refractory fillers include the conventional low-expansion crystalline ceramic materials found useful in the technology of lead solder glasses: beta eucryptite, spodumene, cordierite, zirconium silicate, zinc silicate (willemite), and titanates such as lead titanate and lead calcium titanate. Also included are refractory fillers made from Group V metal oxides in the periodic table (P, As, Sb, V, Nb, and Ta), as listed in Table 1 such as refractory zirconium phosphate, calcium titanium phosphate, niobium phosphate, tin phosphate, niobium pentoxide, and its derivatives such as aluminum niobate, niobium titanate, and niobium zirconate.

Table 1 below lists examples of this class of refractory fillers, together with linear thermal expansion values, where known.

TABLE 1

| Refractory Fillers | Linear Thermal Expansion $10^{-7}$/°C. 30–350° C. |
| --- | --- |
| PHOSPHATES | |
| $AlO_3$—$P_2O_5$ | 5 |
| $NbPO_5$ | |
| $9NbO_5$—$P_2O_5$ | |
| $2ZrO_2$—$P_2O_5$ | 17 |
| $ZrO_2$—$0.1Nb_2O_5$—$P_2O_5$ | 3 |
| $PTaO_5$ | |
| $PTa_9O_{25}$ | |
| CaO—$0.5Zr_2P_3O_{12}$ | −16 |
| $NaTi_2P_3O_{12}$ | −5 |

TABLE 1-continued

| | Linear Thermal Expansion $10^{-7}/°C$ |
|---|---|
| VANADATES | |
| ZrO—$V_2O_5$ | |
| 23$Nb_2O_5$—2$V_2O_5$ | 0 |
| 9$Nb_2O_5$—$V_2O_5$ | 0 |
| ARSENATES | |
| 2$ZrO_2$—0.1$As_2O_5$—$P_2O_5$ | 10 |
| PbO—0.1$As_2O_5$—$TiO_2$ | −25 |
| ANTIMONATES | |
| 2$ZrO_2$—0.1$Sb_2O_5$—$P_2O_5$ | 10 |
| PbO—0.1$Sb_2O_5$—$TiO_2$ | −25 |
| NIOBATES | |
| $Nb_2O_5$ | −5 |
| $Al_2O_3$—$Nb_2O_5$ | 26.5 |
| PbO—$Nb_2O_5$ | 13 |
| 2PbO—$Nb_2O_5$ | 26 |
| MgO—$Nb_2O_5$ | 50 |
| PbO—0.1$Bi_2O_3$—$TiO_2$—$Nb_2O_5$ | −15 |
| $La_3NbO_7$ | |
| $LaNbO_4$ | |
| $LaNb_3O_9$ | |
| $La_2Nb_{12}O_{33}$ | |
| $ZrO_2$—12$Nb_2O_5$ | |
| 3$Nb_2O_5$—2$TiO_2$ | |
| $Nb_2O_5$—$TiO_2$ | |
| TANTALATES | |
| $Ta_2O_5$ | 20 |
| 3PbO—4$Ta_2O_5$ | 65 |
| PbO—2$Ta_2O_5$ | 40 |
| $La_3TaO_7$ | |
| $LaTaO_4$ | |
| $LaTa_3O_9$ | |
| $La_2Ta_{12}O_{33}$ | |
| 2$Nb_2O_5$—$Ta_2O_5$ | |
| $Ta_2ZrO_6O_{19}$ | |
| $Ta_6ZrO_{17}$ | |
| $TiTa_2O_7$ | |

It should be obvious to one skilled in the art that the choice and quantity of filler to admix with a particular glass from this invention is a function of compatibility, thermal expansion differential, particle size distribution, and the type of ceramic parts to be bonded, or metal or glass substrate. The maximum ratio of filler to glass powder is limited by the onset of lack of flow of the sealing glass when melted.

The mixtures are prepared by introducing the glass and refractory powder into a ball mill and milling in a conventional manner to reduce the bulk components to finely divided particles that are uniformly mixed. Alternatively the glass can be ground separately, screened, and then combined with the filler powder.

The resulting glass refractory mixtures may be applied to the work piece as such, or they may be mixed with an organic vehicle to form a paste to coat the work piece with is thereafter heated to melt the glass and produce the seal coating. The organic vehicles are synthetic solvents boiling preferably in the range of 150°-230° C., such as butyl carbitol, butyl carbitol acetate, or similar solvents.

A metal powder filler such as silver or gold or other noble metal, preferably silver, may be mixed with the glass powder of the invention in amounts of 50 to 95% by weight, usually 70-80%, based on the mixture, for die-attach applications in semiconductor chip packaging (e.g., to bond semiconductor devices to substrates such as alumina). The powdered metal may be spherical or flake powder or mixtures of the two, preferably having surface areas from about 0.3 to 1.3 square meters per gram and tap densities from about 2.4 to 3.4 gram per cubic centimeter.

The die attach adhesives of this invention are an admixture of flaked and/or dendritic silver, gold or platinum and the multicomponent glass of this invention in fine powder form in a ratio of 2:1 to 100:1 by weight, preferably 3:1 to 20:1 along with a high boiling point solvent such as terpineol and butyl carbitol acetate, and optionally a polymeric binder such as an acrylic binder. The preferred metal for use is silver. Because of the very low melting point of the glasses, a lower temperature is required to achieve a good bond than conventional die attach silver/glass pastes.

Although the prime objective in the use of these glasses and glass-filler mixtures of this invention is a low sealing temperature in the 300° C. range, it should be understood that there may be special applications requiring a higher temperature. Thus, no upper limit in temperature is inherent in the application of the glass materials of this invention.

It will be readily understood by those of skill in the glass-making art that any chemical precursors to the oxides of the compositions described in this application can be used to formulate the glasses.

The sealing glasses of the invention are coated onto metal, glass, or ceramic parts at thicknesses in the range of about 100-700 microns (4-28 mils). These metal, glass, or ceramic parts are usually produced in the form of square or rectangular bodies in sizes ranging from about 6-25 mm per side and 200-2500 microns thick, flat or with a recess. The sealing glass pattern (coating) over the entire surface or around the edges is formed by printing and glazing. These parts are sealed at low temperature on ceramic electronic packages known commercially as side-brazed packages, chip carriers, and pin grid arrays, as well as metal packages.

The following examples describe the preparation and composition of the sealing glasses of the invention. These examples are not intended to limit the invention in any manner.

EXAMPLE 1

A glass was prepared by mixing 112 grams tellurium oxide ($TeO_2$), 74 grams vanadium pentoxide ($V_2O_5$) and 14 grams niobium pentoxide ($N_2O_5$). After heating the mixture in a ceramic crucible at 750° C. for one hour the very fluid melt was poured through revolving stainless steel rollers to quench the liquid melt to produce highly stressed glass flakes. The resulting glass composition was in weight percent as follows:

| | |
|---|---|
| $TeO_2$ | 56% |
| $V_2O_5$ | 37% |
| $Nb_2O_5$ | 7% |

This glass has a linear thermal expansion (25°-200° C.) equal to $140 \times 10^{-7}/°C$. and a glass transition temperature (Tg) of 280° C. The glass flakes were ground in a ceramic ball mill and the resulting powder screened through a 100 mesh screen.

The resulting glass powder was spread on an alumina plate to measure the thermal stability of the glass in powder form as a function of temperature. The present glass powder melted and bonded to alumina at 325° C. The temperature was increased to 380° C. then to 425° C. The glass from this example remained quite stable and did not show any sign of instability such as recrystallization.

EXAMPLE 2

A glass was prepared similarly to Example 1 by mixing 112 grams TeO$_2$, 74 grams V$_2$O$_5$ and 14 grams zirconium oxide (ZrO$_2$). The resulting glass has a composition in weight percent as follows:

| | |
|---|---|
| TeO$_2$ | 56% |
| V$_2$O$_5$ | 37% |
| ZrO$_2$ | 7% |

The physical characteristics of this glass were similar to those from Example 1. A low expansion ceramic filler such as niobium pentoxide was added in the amount to 43% by weight and mixed thoroughly. The mixture was blended with butyl carbitol acetate and printed on ceramic parts (brown 92% alumina) known as Cerdips (ceramic dual-in-line packages). The parts were fired to 370° C. to a thickness ranging from 15 to 18 mils. The parts were then sealed face to face with a metal (alloy 42) lead frame set in between at a temperature of 360° C. for about 12 minutes. The sealed parts were checked for fine and gross leak before and after an extensive series of thermal shocks according to the Military Specifications 886, condition C, (−60° C. to +150° C.). The sealed parts passed over 100 cycles without failure showing the unusual strength and integrity of the packages sealed with the glass of this invention.

Additional examples of low melting glass of this invention were prepared following the procedure described in Examples 1 and 2. These additional Examples 3 to 28 are listed in Tables 2 and 3, below. When heated in powder form all of these glass remained stable with no sign of recrystallization in the temperature range of 300° to 420° C.

TABLE 2

| Examples 3 to 13 in weight percent | | | | | | | | | | | |
|---|---|---|---|---|---|---|---|---|---|---|---|
| | #3 | #4 | #5 | #6 | #7 | #8 | #9 | #10 | #11 | #12 | #13 |
| TeO$_2$ | 55 | 50 | 65 | 70 | 75 | 80 | 45 | 57 | 52 | 50 | 48 |
| V$_2$O$_5$ | 40 | 45 | 30 | 25 | 20 | 15 | 50 | 33 | 38 | 36 | 35 |
| Nb$_2$O$_5$ | 5 | 5 | 5 | 5 | 5 | 5 | 5 | 10 | 10 | 14 | 17 |

TABLE 3

| Examples 14 to 28 in weight percent | | | | | | | | | | | | | | | |
|---|---|---|---|---|---|---|---|---|---|---|---|---|---|---|---|
| | #14 | #15 | #16 | #17 | #18 | #19 | #20 | #21 | #22 | #23 | #24 | #25 | #26 | #27 | #28 |
| TeO$_2$ | 50 | 50 | 48 | 44 | 50 | 45 | 60 | 60 | 46 | 44 | 46 | 46 | 46 | 46 | 54 |
| V$_2$O$_5$ | 29 | 36 | 35 | 32 | 29 | 26 | 35 | 35 | 27 | 26 | 27 | 27 | 27 | 27 | 40 |
| ZnO | 21 | | | | | | | | | | | 4 | | | |
| ZrO$_2$ | | 14 | 17 | | | | | | | | 4 | | | | |
| Bi$_2$O$_3$ | | | | | 21 | 28 | | | | | | | 4 | | |
| CuO | | | | 24 | | | | | | | | | | 4 | |
| P$_2$O$_5$ | | | | | | | 5 | | | | | | | | |
| Ta$_2$O$_5$ | | | | | | | | 5 | | | | | | | |
| PbO | | | | | | | | | 22 | 26 | 22 | 22 | 20 | 21 | |
| Nb$_2$O$_5$ | | | | | | | | | 4 | 4 | | | | | 5 |
| SnO$_2$ | | | | | | | | | | | 1 | | | | |
| TiO$_2$ | | | | | | | | | | | | 1 | | | |
| PbF$_2$ | | | | | | | | | | | | | 3 | | |
| MoO$_3$ | | | | | | | | | | | | | | 1 | |
| WO$_3$ | | | | | | | | | | | | | | 1 | |
| CeO | | | | | | | | | | | | | | | 1 |
| BaO | | | | | | | | | 1 | | | | | | |

EXAMPLE 29

The glass powder prepared according to Example 3 was passed through a 325 mesh screen and blended with 85 percent by weight silver metal powder. About 12 percent of a low vapor pressure solvent with a boiling point of around 230° C. (terpineol) was added to the powder mixture to form a silicon die attach paste. After roll milling the blend to produce a well dispersed flowing paste, a small quantity of the silver glass paste was deposited on a ceramic surface. A set of 500 square mil silicon semiconductor chips were imbedded in the paste dots, the wet paste thickness being controlled to 8 mils. The parts were placed wet on a moving belt furnace and heated to 380° C. for about 10 minutes at peak temperature.

Stud pull test performed on a Sebastien 111 tensile test analyzer indicated adhesion in the 50 kilos range at which point the die broke with cohesive failure in the silver/glass layer. It can be seen that the strength of this low temperature silver/glass bond is extremely high and comparative to commercial silver/glass materials fired at 430° C.

EXAMPLE 30

The glass powder prepared according to Example 28 was passed through a 400 mesh screen and blended with 85 percent by weight silver metal powder, the silver powder itself being a mixture of 80 parts by weight silver flakes, 15 parts dendritic silver powder (i.e., precipitated irregularly shaped silver powder) and 5 parts silver oxide.

About 12 percent of a low vapor pressure solvent with a boiling point in the 200° C. range was added to the powders to form a silicon die attach paste. After roll milling the blend to produce a well dispersed flowing paste the resulting dotting paste was tested according to Example 28 with similar excellent adherence results.

EXAMPLE 31

The glass flakes prepared according to Example 1 were ground in a ball mill and the resulting powder passed through a 200 mesh screen. The fine glass powder was mixed with 40 percent by weight, based on the mixture, niobium pentoxide (Nb$_2$O$_5$), a refractory metal oxide with an expansion of $-5 \times 10^{-7}/°$ C., and formed into a paste with 12% butyl carbitol acetate. The resulting paste was screen printed on alumina parts (brown 92% alumina, balance SiO$_2$, MnO, FeO, NiO), dried and heated to about 360° C. to melt the sealing glass material. The thickness of the fused glass layer was of the order of 200 microns (8 mils).

The glazed alumina parts were inverted and held in position by pressure exerted by a metal clip to a conventional gold plated ceramic microelectronic base. The structure was heated at a rate of 75° C. per minute to a peak of 370° C. for ten minutes, then cooled to room temperature to produce a tight, strong vitreous seal. The structure was tested for gross and fine leak ($5 \times 10^{-9}$ cc/sec He). The parts were then subjected to 100 cycles of liquid-to-liquid thermal shock, condition C (MIL-STD-883), demonstrating the unusually strong nature of the sealing glass of this invention even to a gold ring surface.

EXAMPLE 32

The glass powder prepared according to Example 28 was passed through a 100 mesh screen, mixed with 40% by weight niobium pentoxide powder and formed into a paste with about 12% butyl carbitol acetate. The resulting printing paste was screen printed on gold plated Kovar metal lids, dried and heated to about 360° C. to melt the sealing glass material. The parts were inverted and positioned on sidebrazed alumina ceramic packages. After a heat treatment through a belt furnace set at 360° C. the sealed parts were tested for strength and hermeticity according to Example 31 with similar results.

EXAMPLE 33

The glass flakes prepared according to Example 1 were ground in a ball mill and the resulting powder passed through a 140 mesh screen. The fine glass powder was mixed with 43 percent by weight, based on the mixture, niobium pentoxide powder and formed into a printing paste with about 12 percent butyl carbitol acetate. The resulting paste was screen printed on alumina Cerdips (ceramic dual in line packages), dried and heated to about 360° C. to melt the glass powder. The thickness of the fired glass layer was of the order of 15 to 25 microinches. A metal lead frame made of alloy 42 was inserted into one of the Cerdip parts (base). The two ceramic parts with the glass side face to face were bonded by heating the structure at a rate of 75° C. per minute in air for about 1-12 minutes at peak (375° C.) without any external pressure the cooled to room temperature to produce a tight, strong, vitreous seal.

The structure was tested for gross and fine leaks ($5 \times 10^{-9}$ cc/sec He). The parts were then subjected to 100 cycles of liquid-to-liquid thermal shock, condition C (MIL-STD-883) with no hermetic failure demonstrating the unusually strong nature of the sealing glass of this invention.

EXAMPLE 34

The glass powders prepared according to Examples 1-28 are mixed in varying amounts with different types of low expansion refractory powder including those listed in Table 1.

Modifications of the above described modes of carrying out the invention that are obvious to those in the fields of glass manufacture, semiconductor or other electronic part packaging and related fields are intended to be within the scope of the following claims.

We claim:

1. A low melting glass composition consisting essentially of:
   (a) $TeO_2$: 35 to 80%
   (b) $V_2O_5$: 15 to 50%, and
   oxides selected from the group consisting of
   (i) $Nb_2O_5$, $ZrO_2$, and ZnO 0.1 to 20%,
   (ii) $Bi_2O_3$ and CuO 0.1 to 30%, and
   (iii) $P_2O_5$ and $Ta_2O_5$ 0.1 to 10%, and
   up to 10% (weight calculated on an oxide basis) of $SnO_2$, CdO, BaO, $WO_3$, $MoO_3$, $TiO_2$, or a metal fluoride, said composition being substantially free of $Ag_2O$.

2. A low melting glass composition consisting essentially of in weight percent calculated on a oxide basis:
   (a) $TeO_2$: 50 to 60%
   (b) $V_2O_5$: 30 to 50%
   (c) $Nb_2O_5$, ZnO and/or $ZrO_2$: 1 to 10%.

3. The glass composition of claim 1 mixed with about 1 to 50% by weight, based on the mixture, of a refractory filler powder having a low coefficient of linear expansion.

4. The glass composition of claim 2 mixed with about 1 to 50% by weight, based on the mixture, of a refractory filler powder having a low coefficient of linear expansion.

5. The glass compositions of claim 3 wherein the refractory filler is a metal silicate, phosphate, titanate, zirconate or niobate.

6. The glass compositions of claim 4 wherein the refractory filler is a metal silicate, phosphate, titanate, zirconate or niobate.

7. The glass compositions of claim 3 wherein the filler is a group V metal oxide.

8. The glass compositions of claim 4 wherein the filler is a group V metal oxide.

9. The glass compositions of claim 3 wherein the refractory filler is niobium pentoxide.

10. The glass compositions of claim 4 wherein the refractory filler is niobium pentoxide.

11. The glass composition of claim 1 mixed with 50% to 95% by weight, based on the mixture, of silver, gold or other noble metal powder.

12. The glass composition of claim 2 mixed with 50% to 95% by weight, based on the mixture, of silver, gold or other noble metal powder.

13. A die attach composition consisting essentially of an admixture of:
    (a) silver metal powder;
    (b) the glass composition of claim 1; and
    (c) a high boiling point solvent.

14. A die attach composition consisting essentially of an admixture of:
    (a) silver metal powder;
    (b) the glass composition of claim 2; and
    (c) a high boiling point solvent.

15. An article of manufacture for use in sealing an electronic part comprising a metal, glass, or ceramic body coated with a pattern of the glass composition of claim 1.

16. An article of manufacture for use in sealing an electronic part comprising a metal, glass, or ceramic body coated with, a pattern of the glass composition of claim 2.

* * * * *